(12) United States Patent       (10) Patent No.:      US 8,581,443 B2
Jung et al.                     (45) Date of Patent:     Nov. 12, 2013

(54) CIRCUIT ARRANGEMENT AND METHOD FOR INDUCTIVE ENERGY TRANSFER

(75) Inventors: Philipp Jung, Griesheim (DE); Joachim Lepper, Usingen (DE); Jan Christian Langsdorf, Oberursel (DE); Lutz Ronald Herzberg, Frankfurt am Main (DE); Thomas Hohmann, Gelnhausen (DE)

(73) Assignee: Braun GmbH, Kronberg (DE)

( * ) Notice: Subject to any disclaimer, the term of this patent is extended or adjusted under 35 U.S.C. 154(b) by 474 days.

(21) Appl. No.: 12/889,743

(22) Filed: Sep. 24, 2010

(65) Prior Publication Data

US 2011/0012432 A1    Jan. 20, 2011

Related U.S. Application Data

(63) Continuation-in-part of application No. PCT/IB2010/052587, filed on Jun. 10, 2010.

(30) Foreign Application Priority Data

Jun. 10, 2009   (EP) .................................. 09007662

(51) Int. Cl.
    *H01F 27/42*    (2006.01)

(52) U.S. Cl.
    USPC .......................................................... 307/104

(58) Field of Classification Search
    USPC .......................................................... 307/104
    See application file for complete search history.

(56) References Cited

U.S. PATENT DOCUMENTS

2002/0158791 A1* 10/2002 Meier ............................ 342/70

FOREIGN PATENT DOCUMENTS

| JP | 03239137  | 10/1991 |
| JP | 3270655   | 12/1991 |
| JP | 6054454   | 2/1994  |
| JP | 10189369  | 7/1998  |

OTHER PUBLICATIONS

International Search Report with Written Opinion, mail date Feb. 3, 2011, 10 pages.

* cited by examiner

*Primary Examiner* — Robert L. Deberadinis
(74) *Attorney, Agent, or Firm* — David Michael Weirich; Vladimir Vitenberg

(57) ABSTRACT

A method and a circuit arrangement for the inductive transfer of energy with an oscillator and a device to detect the inductive load of the oscillator, and to modify a damping element in the oscillator depending on the load of said oscillator.

15 Claims, 5 Drawing Sheets

CIRCUIT ARRANGEMENT AND METHOD FOR INDUCTIVE ENERGY TRANSFER

CROSS REFERENCE TO RELATED APPLICATION

This application is a continuation-in-part application of prior copending International Application No. PCT/IB2010/052587, filed Jun. 10, 2010, designating the United States.

FIELD OF THE INVENTION

The invention relates to a circuit arrangement and a method for inductive energy transfer for small electrical appliances, for example for an electric toothbrush or an electric shaver.

BACKGROUND OF THE INVENTION

Small, battery-operated electrical appliances are typically charged at an external charging station. Contactless charging stations that inductively transfer electrical energy from the charging station to the appliance are especially popular. For this purpose, an alternating magnetic field is generated in the charging station by an oscillator that has a coil element and a capacitor element, wherein the coil element simultaneously forms the primarily coil of an inductive transformer and the secondary coil of the transformer is arranged in the appliance to be charged. Therefore the charging station is designated as the primary side and the appliance to be charged is designated as the secondary side. Such a charging station in which the oscillator is operated with a stabilized voltage or oscillates with a constant amplitude is known from JP 6-54454 A.

Modern charging stations typically have three operating states. The first state is the operating mode in which the secondary side continuously requests power, for example to operate the appliance or to charge a battery installed in the appliance. The second state is a simple standby mode in which the appliance is not located in the charging station, i.e. no power at all is requested. The third state is what is known as extended standby mode in which the appliance is located in the charging station but only occasionally requires power, for example, because although the battery is fully charged, it must occasionally be recharged to compensate for self-discharge or the power consumption of the appliance. In the latter case, the charging station should switch back and forth between the simple standby mode and the operating mode as needed. The respective operating state of the charging station (primary side) is thus determined by the energy demand of the small electrical appliance (secondary side).

It is known to detect the energy demand of the secondary side directly at the secondary side, to transfer corresponding information to the primary side and to adjust the oscillator accordingly, for example to adjust the base emitter voltage of a transistor operating in the oscillator. This solution is quite complicated because transmission means for the information from the secondary side to the primary side are required. Alternatively, the energy demand of the secondary side could be determined in that the (primary side) power consumption of the oscillator is measured and the oscillator is controlled accordingly. However, this variant is less suitable for adjusting multiple operating states because, due to the typically weak coupling between the primary and the secondary sides of the transformer, the power consumption of the charging station is only weakly affected by the power consumption of the appliance.

Thus, it would be desirable to minimize the power consumption of the charging station in a standby mode for reasons of energy efficiency. It would also be desirable to specify a method for inductive energy transfer and a circuit arrangement that can be placed into an operating state with further reduced power consumption in a simple manner depending on the power requirement of the secondary side.

BRIEF DESCRIPTION OF DRAWINGS

The invention is explained in detail using exemplary embodiments that are shown in the drawings. Additional embodiments are mentioned in the specification.

DETAILED DESCRIPTION OF THE INVENTION

Figure 1:
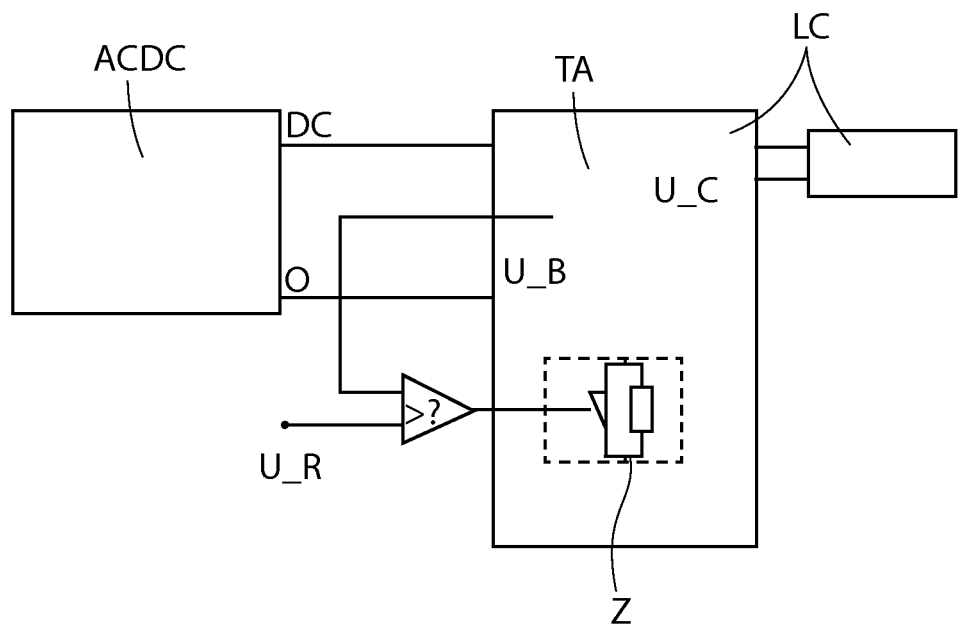
FIG. 1 schematically shows a block diagram of the circuit arrangement.

A solution to the deficiencies of the prior art may be achieved via a circuit arrangement for inductive transfer of energy with an oscillator and with a device to detect the inductive load of the oscillator, and to modify a damping element in the oscillator depending on the load of said oscillator so that the nonreactive power consumption of the circuit arrangement is reduced given a lesser load of the oscillator (standby mode).

The damping element may contain a controllable resistor through which the resistance of the damping element can be varied. The damping element may contain at least one ohmic resistor and a controllable switch whose switching path is arranged so that the resistance of the arrangement formed from the at least one ohmic resistor and the switch can be switch-selectable. In one embodiment of the circuit arrangement, the oscillator may comprise an active element in a known manner, for example a transistor. It may consist of a Colpitts or Hartley oscillator in a common base connection. The damping element may be connected as an emitter resistance of the transistor of the oscillator and contains a parallel circuit made up of an ohmic resistor and an electronic switch. In the standby mode the switch is open, such that the emitter resistance assumes a comparably large value and accordingly reduces the amplitude of the oscillator oscillation in comparison to the operating mode, in which the switch is closed. The nonreactive power consumption of the circuit arrangement may therefore be reduced.

The oscillator may be designed so that it also oscillates in the standby mode, but with an amplitude that is reduced in comparison to the operating mode. This is sufficient in order to reduce the power consumption of the circuit arrangement to the desired degree. Also, the device may be able to detect the inductive load of the oscillator by the secondary side is in operation in the standby mode so that an occurrence of an increased power demand at the secondary side can be detected immediately and the power of the oscillator can be adapted instantaneously.

The device to detect the inductive load of the oscillator determines the load of the oscillator and thus the power demand of the secondary side using an electrical variable occurring in the oscillator, compares this with a reference value, and controls the electronic switch so that the damping element of the oscillator is modified as necessary depending on the load of said oscillator. The electrical variable is, for example, the amplitude of the collector voltage or the base voltage of the transistor of the oscillator. Generally, only the amplitude or an average of the amplitude of the negative semi-oscillation of the collector voltage or base voltage is detected in the oscillator, however, this is not the only contemplated embodiment. The amplitude of the negative half-wave of the oscillator oscillation namely varies particularly strongly depending on the load at the secondary side.

The invention also comprises a method for inductive transfer of energy to a small electrical appliance (secondary side) in which an alternating magnetic field is generated in a circuit arrangement with an oscillator at the primary side and is radiated to the secondary side, and a damping element in the oscillator is varied by means of a device to detect the inductive load of the oscillator depending on the load of the oscillator, wherein given a smaller load of the oscillator the nonreactive power consumption of the circuit arrangement is reduced by modifying the damping element.

The power demand of the secondary side, i.e. the load of the oscillator, is determined from an electrical variable that is detected in the oscillator. Generally, the amplitude or the average of the amplitude of the negative semi-oscillation of the base voltage or collector voltage of a transistor present in the oscillator is detected, compared with a reference value, and the damping element is modified accordingly if necessary. The damping element comprises a controllable resistor whose resistance is preferably switch-selectable by a controllable switch, for example the value of the emitter resistance of the transistor of the oscillator.

The circuit arrangement can be designed to inductively charge an energy storage that is arranged in a small electrical appliance, for example an electric toothbrush, an electric shaver or a communication appliance.

The block diagram according to FIG. 1 illustrates the principle design of an inductive charging station. A capacitor element and a coil element are arranged in a self-oscillating oscillator LC. The oscillator LC serves for the generation of an alternating magnetic field. The coil element of the oscillator simultaneously serves for the inductive transfer of energy from the oscillator LC to a secondary side (not shown in the Figure). The oscillator LC draws electrical power from the mains via a power supply ACDC and comprises an active element T1 to generate oscillation. The oscillator comprises a damping element Z whose resistance is variable to adjust the amplitude of the oscillation.

Figure 2:
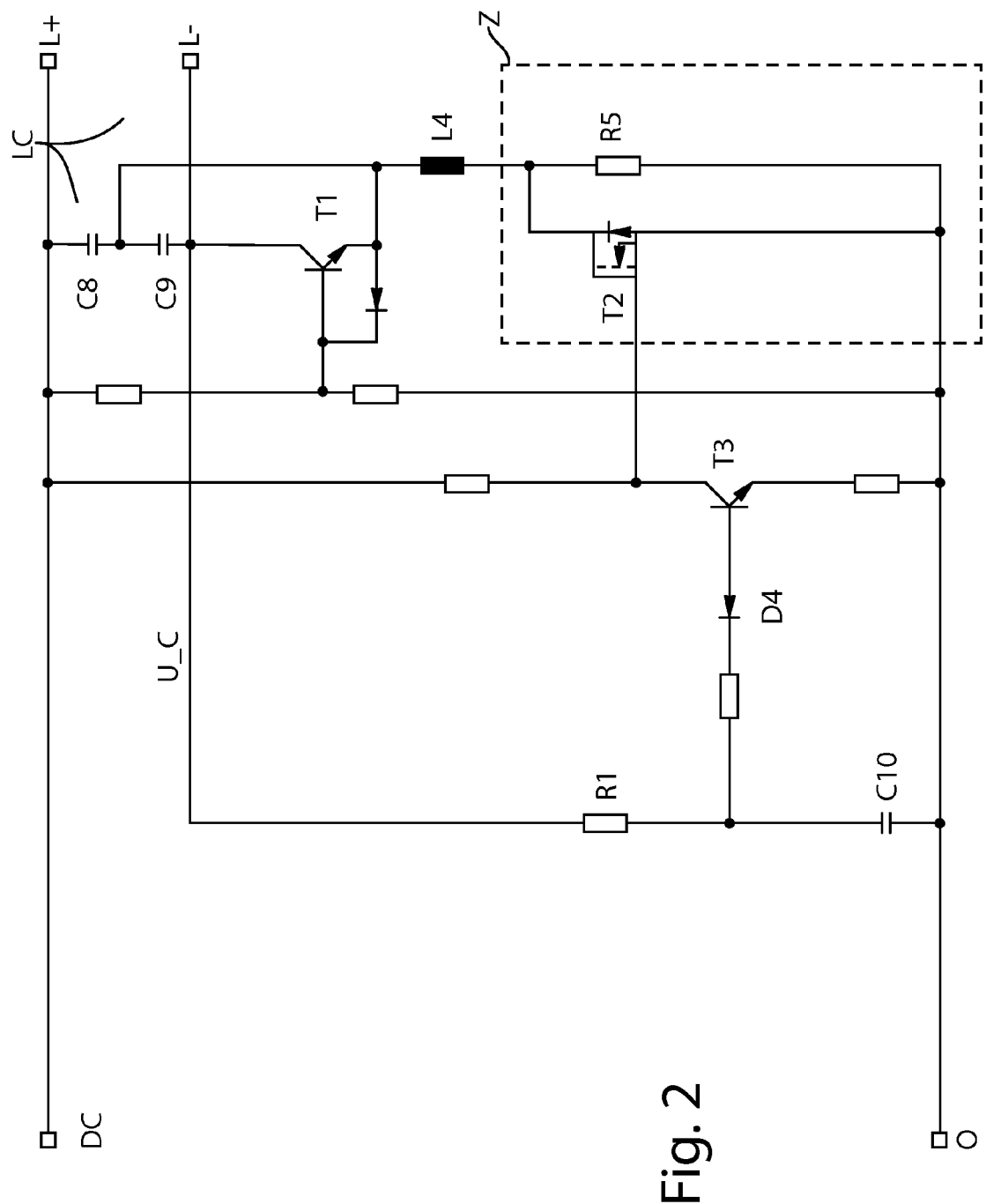
FIG. 2 schematically shows a first embodiment of a circuit arrangement.
Figure 3:
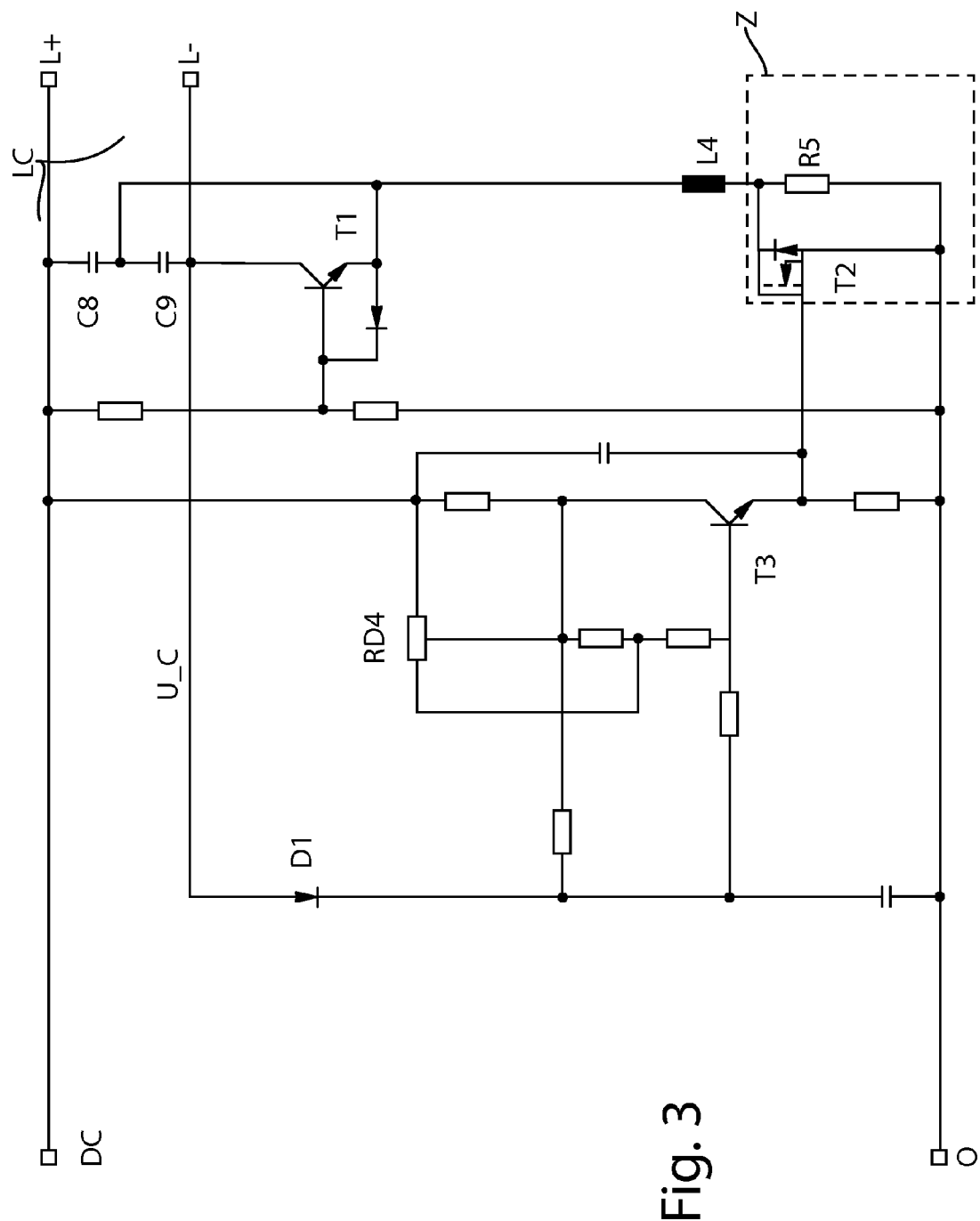
FIG. 3 schematically shows a second embodiment of a circuit arrangement.
Figure 4:
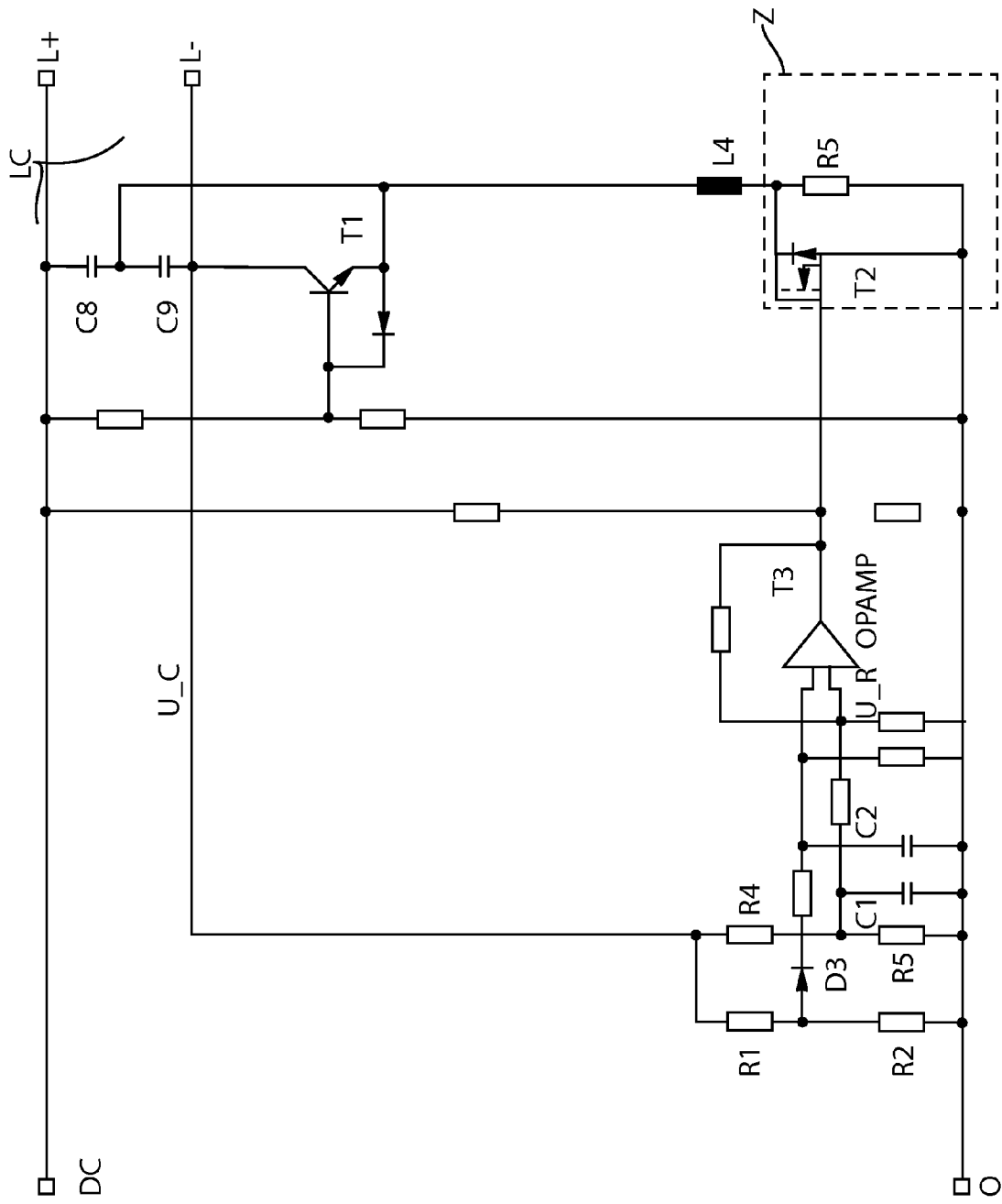
FIG. 4 schematically shows a third embodiment of a circuit arrangement.
Figure 5:
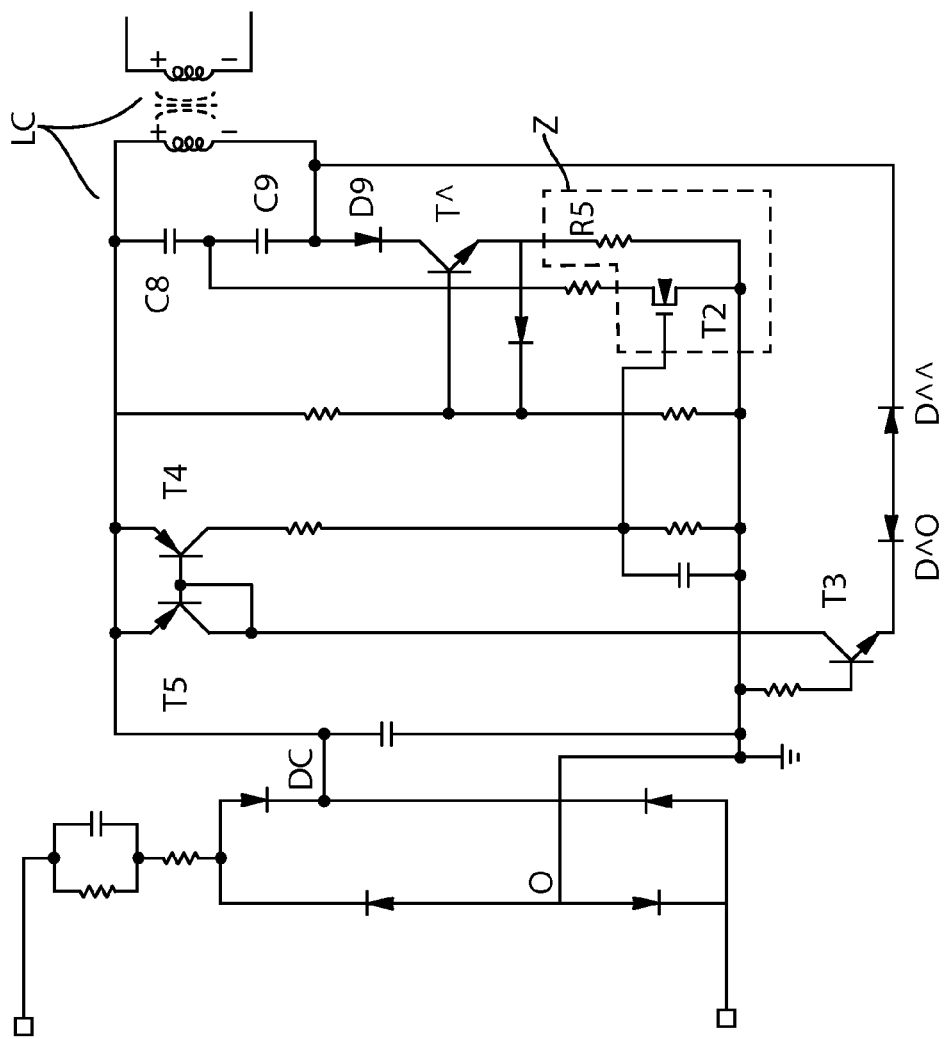
FIG. 5 schematically shows a fourth embodiment of a circuit arrangement.

FIG. 2 through FIG. 4 show exemplary embodiments of the circuit arrangement in a more detailed form. The power supply ACDC is not shown in these Figures; the power supply is connected with the terminals DC and 0.

FIG. 2 shows the first exemplary embodiment. The oscillator comprises the capacitors C8 and C9 and a coil, of which only the terminals L+ and L− are shown. The latter simultaneously serves for the radiation of the magnetic field. The oscillator LC forms a Colpitts oscillator with an active element T1 that is formed by a transistor. The electrical energy fed into the oscillator LC is adjusted by a damping element Z that, in series with a coil L4, serves as a variable emitter resistance for the active element T1. The damping element Z comprises an ohmic resistor R5 and a field effect transistor T2 whose drain source path is parallel to the resistor R5. The current flow, and thus the energy feed in the oscillator LC, is adjusted by varying the emitter resistance of T1. Given a circuit that is designed only for low power, the coil L4 can also be replaced by an ohmic resistor.

The emitter resistance of the active element T1 is controlled by an additional active element, the transistor T3, whose base is connected with the collector of the transistor T1 via a Zener diode D4 and a sample-and-hold branch made up of R1 and C10. The Zener diode D4 serves as a comparator. If the collector potential U_C at T1 exceeds the sum of the breakdown voltage of the Zener diode D4 and the base emitter voltage of T3, the collector-emitter path of the transistor T3 is connected through. The potential at the gate of the field effect transistor T2 is hereby pulled down to ground, such that the n-channel field effect transistor T2 is blocked. The ohmic resistance of the damping element Z in the oscillator assumes its maximal value, i.e. the value of the resistor R5. Only a small current therefore flows into the oscillator LC; the energy supply is minimal. If power is drawn from the oscillator via the magnetic field, the oscillation will decay. Thus the maximum potential, i.e. the amplitude of the oscillation at the collector, will hereby drop again, whereby the voltage across the Zener diode D4 likewise drops. If the voltage finally drops below the sum of the breakdown voltage and base emitter voltage of T3, the transistor T3 is blocked. The potential at the gate of T2 then assumes a high value again, such that the field effect transistor T2 connects through. The ohmic resistance of the damping element Z then assumes its minimum value, such that the current through the element and therefore the energy feed into the oscillator increases again. The circuit accordingly acts as a closed control circuit.

Since the energy feed into the oscillator LC is adjusted via a variation of the ohmic resistance of the oscillator, the energy feed for the circuit can be reliably adjusted in a simple manner. Conversely, a variation of the values of the capacitance or the inductance of the oscillator would affect the oscillation frequency of the oscillator and would therefore lead to a severe detuning of the oscillator. A detuned oscillator is not as well suited for a circuit arrangement that should be operated in defined states. The present solution offers better adjustment capabilities relative to a direct influencing of the energy feed with only control of the transistor T1. The circuit arrangement, for example a charging station, can be realized with multiple operating states or with precisely two defined operating states.

Instead of a Zener diode, a reference diode RD4 can be used as a comparator. FIG. 3 shows such a second embodiment. The collector potential of T1 is supplied via a diode D1 to the control terminal GND of the reference diode RD4. If the potential at the control terminal GND remains below an (internally set) reference voltage, the output OUT is low. The pnp-transistor T3 is conductive. The gate of the field effect transistor T2 is hereby connected with VDD; the potential is thus high. The field effect transistor T2 is conductive, such that energy can flow into the oscillator. If the potential at the control terminal GND exceeds the (internally set) reference voltage, the potential at the VDD terminal is connected through to the output OUT. The transistor T3 is hereby blocked. The potential at the gate of the field effect transistor T2 is low, such that the field effect transistor T2 is blocked. The energy feed into the oscillator is minimal.

FIG. 4 shows a third embodiment of the invention. Here the evaluation of the collector potential of T1 occurs by means of an operation amplifier OPAMP as a comparator. A comparison of the peak value of the collector voltage (i.e. the amplitude) with an average value of the collector voltage as a reference voltage U_R takes place by connecting the operation amplifier OPAMP. The reference voltage is adjusted via a voltage splitter comprising the resistors R4 and R5 and the capacitor C1. The peak value of the collector voltage is formed by the voltage splitter comprising the resistances R1, R2 and the diode D3 as well as the capacitor C2. If the peak value drops in relation to the average value, which corresponds to a higher load of the oscillator, the emitter resistance is reduced, such that more electrical energy is supplied again.

In the Colpitts oscillators in common base connection as they are shown in the Figures, instead of the collector voltage U_C, the voltage U_B at the base of the active element T1 can be evaluated for load detection. Moreover, instead of a Colpitts oscillator, a Hartley oscillator can be used. Instead of the positive amplitude of the oscillator voltage, the negative portion of the oscillator voltage can also be evaluated. For example, a microcontroller can be used as a comparator to which the negative half-wave of the base voltage or collector voltage of T1 is supplied. This voltage can be fed via a correspondingly oriented rectifier diode and is representative of the load in the oscillator. In the microcontroller, this voltage of T1 can be compared with a voltage reference that is set internally in the microcontroller.

Switch-mode power supplies are especially well suited to provide the supply voltage DC for the circuit arrangements described in FIGS. 2 through 4 since these adapt their power consumption from the mains particularly well to their power output to the circuit arrangements, which means that the switch-mode power supply only draws a small amount of power from the mains if it must deliver only a small amount of power to the circuit arrangement, and vice versa.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A circuit arrangement for inductive transfer of energy including:
   an oscillator having a damping element; and
   a device to detect the inductive load of the oscillator and to affect modification of the damping element in the oscillator depending on the load of the oscillator.

2. The circuit arrangement according to claim 1, wherein the damping element comprises a controllable resistor through which the resistance of the damping element can be varied.

3. The circuit arrangement according to claim 2, wherein the damping element is formed by at least one resistor and the switching path of a controllable switch, and that the resistance of the arrangement formed from the resistor and the switch can be switch-selectable.

4. The circuit arrangement according to claim 2, wherein the device to detect the load of the oscillator comprises a comparator which is designed to control the controllable switch depending on an electrical variable and a reference variable.

5. The circuit arrangement according to claim 2, wherein the resistance is varied when the electrical variable has reached a threshold.

6. The circuit arrangement according to claim 1, wherein the device to detect the inductive load of the oscillator determines the load of the oscillator and therefore the power demand of a secondary side using an electrical variable occurring in the oscillator.

7. The circuit arrangement according to claim 6, wherein the oscillator has an active element and the electrical variable is the voltage at a terminal of the active element.

8. The circuit arrangement according to claim 1, wherein the oscillator is a Hartley or Colpitts oscillator with an active element.

9. The circuit arrangement according to claim 8, wherein the oscillator has a transistor and the transistor is operated in common base connection and the damping element is connected as an emitter resistance of the transistor.

10. The circuit arrangement according to claim 9, wherein the electrical variable is the amplitude or the average of the amplitude of the negative semi-oscillation at a collector terminal or at a base terminal of the transistor.

11. A method for inductive transfer of energy by means of a circuit arrangement that comprises an oscillator and a device to detect the inductive load of the oscillator, wherein a damping element in the oscillator is varied depending on the load of the oscillator.

12. The method according to claim 11, wherein the damping element comprises a controllable resistor whose resistance is varied given a smaller load of the oscillator so that the nonreactive power consumption of the circuit arrangement is reduced.

13. The method according to claim 12, wherein the resistance of the damping element is varied depending on an electrical variable that is detected in the oscillator.

14. The method according to any of claim 11, wherein the power demand of a secondary side is determined from an electrical variable that is detected in the oscillator.

15. The method according to claim 14, wherein the power demand of the secondary side is determined using the negative half-wave of the base voltage or collector voltage of a transistor present in the oscillator.

* * * * *